Patented Dec. 13, 1938

2,139,679

UNITED STATES PATENT OFFICE 2,139,679

DIAMIDES OF UNSATURATED CARBOXYLIC ACIDS AND PROCESS OF MAKING THE SAME

Vernal R. Hardy, Wilmington, Del., assignor to E. I. du Pont de Nemours & Company, Wilmington, Del., a corporation of Delaware No Drawing. Application July 2, 1937,
Serial No. 151,765

16 Claims. (Cl. 260—124)

This invention relates to new organic chemical compounds and more particularly to amido compounds from diamines of at least six carbon atoms and unsaturated monocarboxylic acids.

This invention has as an object the preparation of new compounds. A further object is the preparation of new compounds which are useful as plasticizers, waxes, insecticides and coatings for transparent sheet materials to prevent the same from sticking together. Other objects will appear hereinafter.

These objects are accomplished by the following invention wherein a diamine $NH_2$—R—$NH_2$, in which R is a saturated open-chain hydrocarbon radical of at least six carbon atoms, is reacted, preferably in an inert atmosphere and under other conditions set forth more fully below, with an unsaturated but substantially unpolymerizable aliphatic monocarboxylic acid or amide-forming derivative of said acid, such as the anhydride, an amide, an acid halide, or an ester thereof, and the resulting diamide isolated. The principal acids and amide-forming derivatives thereof suitable for use in the invention have the comprehensive formula R'—CO—Q in which R' is an unsaturated aliphatic hydrocarbon radical in which the carbon adjacent to —CO—Q is joined to other atoms by single bonds only and Q is a radical whose hydride QH is miscible with water.

In carrying out the invention, the appropriate amine and acid are heated together in the proportion of about one mol of amine to two mols of acid and at temperatures in the range of about 160 to 270° C. and preferably 180 to 230° C., until no more water is evolved. The product may be purified if desired by washing with dilute aqueous alkali and crystallizing. The reaction preferably should be carried out in an inert atmosphere such as nitrogen. In the case of amide-forming derivatives of the acid, temperatures should be adjusted in accordance with the reactivity of the particular derivative used. Such variations will be apparent to one skilled in the art.

The more detailed practice of the invention is illustrated by the following examples, wherein parts given are by weight unless otherwise stated. There are of course many forms of the invention other than these specific embodiments.

Example I

A mixture of 15 parts of hexamethylenediamine and 47 parts of 10-undecenoic acid (obtained by pyrolysis of castor oil) was heated in a current of purified nitrogen for 1.5 hours at a temperature of 190–200° C. The apparatus was so arranged that any volatile product of the reaction could be condensed, and during the reaction a total volume of 4.4 parts of water was collected. On cooling, the reaction mixture solidified. The crude hexamethylenediundecylenamide was recrystallized from 750 parts of ethyl alcohol and there was obtained 39 parts of the pure amide melting at 132.5–135.5° C. The product on analysis was found to contain 6.25% nitrogen as compared with the calculated nitrogen content of 6.29%.

Example II

A mixture of 50 parts of decamethylenediamine and 162 parts of oleic acid was heated in a current of purified nitrogen for 3 hours at a temperature of 180–190° C. On cooling, the reaction mixture solidified. The crude product was recrystallized several times from n-butanol. It was finally washed with ethanol and dried in vacuo. In this way there were obtained 150 parts of decamethylenedioleamide melting at 108–109° C.

Example III

A mixture of 86.4 parts of China-wood oil acids (two mols) and 25.8 parts (one mol) of decamethylenediamine was heated at 150–170° C. for 1.5 hours and then at 185–215° C. for 1.5 hours. The resulting product was a brittle, opaque, light-brown solid which had an acid number of about 19 and softened at 40–45° C.

Example IV

A mixture of 86.4 parts of linseed oil acids and 25.8 parts of decamethylenediamine was heated at 195–230° C. for 3.5 hours. The resulting product was a brown, opaque solid which had an acid number of about 5 and softened at 35–40° C.

The above examples illustrate typical methods by which any of the amides contemplated by the invention may be prepared. These amides have the comprehensive formula

in which R is a saturated open-chain and preferably straight chain hydrocarbon radical of at least six carbon atoms, and R' is an unsaturated open chain and preferably straight chain hydrocarbon radical in which the carbon adjacent to the carbonyl group is joined to other atoms only by single bonds. These amides may be considered as derived from amines of the formula $NH_2$—R—$NH_2$ and acids of the formula R'COOH, wherein R and R' have the definitions just given, which types of acids and amines are of generic utility in the invention. That the carbon of R' which is joined to the carboxyl be of the type stated is necessary since the acid would otherwise possess alpha-beta unsaturation which would render it more or less polymerizable under the conditions of reaction and thus unsuited for use in the present invention, which is directed to the preparation of monomeric diamides.

Specific amines suitable for use in the invention include hexamethylenediamine, heptamethylenediamine, decamethylenediamine, pentadecamethylenediamine, 2,5-diaminohexane, 1,4-diamino-2 - methylpentane, 2,5 - diamino-2,5 - dimethylhexane and 2,6-diamino-2,6-dimethylheptane. Any straight or branched chain amine having the formula previously given may be used. Straight chain diamines are preferred. Specific acids that are suitable include oleic, 10-undecenoic, 3-butenoic, 4-pentenoic, 4-hexenoic, 9-decenoic, 8-nonenoic, 6-heptadecenoic, oleic, elaidic, brassidic, ricinoleic, 3-methyl-3-butenoic, 4-methyl-4-pentenoic, 3 - methyl - 3 - pentenoic, 2,2-dimethyl-3-butenoic, 4-methyl - 5 - hexenoic, 2,2 - dimethyl-3-pentenoic, 3,3-dimethyl-4-pentenoic, 2,2,3-trimethyl-3-butenoic, 2,6-dimethyl-5-heptenoic, 5-ethyl-4-heptenoic, diallylacetic, diallylbutyric, eleostearic, linoleic, 4,8-dimethyl-4,7 - nonadienoic, 3,3,4,8-tetramethyl - 4,7-nonadienoic acids, as well as the mixed acids obtained by saponification of drying and semi-drying fatty oils such as cottonseed, China-wood, peanut, soya bean, linseed, oiticica, and castor oils. The acid may be straight or branched chain, and it may be mono- or polyunsaturated. Among the amide-forming derivatives of the acid which may be used in lieu of the free acid are the following: 4-pentenoic acid chloride, 2,2-dimethyl-3-butenamide, citronellamide, α-monoolein, elaidyl chloride, brassidyl chloride, ethyl linoleate, and 2,6-dimethyl-5-heptenamide.

The products of the present invention may also be prepared by subjecting to pyrolysis (alone or in the presence of solvents such as phenol, cresols, and o-hydroxydiphenyl and of inert gases such as hydrogen, water gas, and nitrogen) the addition salt formed between the amine and the unsaturated mono-carboxylic acid. This addition salt may or may not first be isolated and purified. Temperatures for the pyrolysis may range from 120° C. to 300° C. but should preferably be from 160 to 260° C. The progress of the pyrolysis can be followed by measuring the water formed.

So far as is known, the products herein described are new to the art. Their specific structure, involving a certain minimum carbon content in the amine, is reflected in their properties which make them useful as components of high melting waxes, as plasticizers, and as "slip-promoting agents", i. e., coatings for cellulosic sheeting to prevent such sheets from sticking to each other.

The above description and examples are intended to be illustrative only. Any modification of or variation therefrom which conforms to the spirit of the invention is intended to be included within the scope of the claims.

I claim:

1. A diamide of the formula

R'—CO—NH—R—NH—CO—R' wherein R is a saturated open-chain hydrocarbon radical of at least six carbon atoms and R' is an unsaturated open-chain hydrocarbon radical in which the carbon adjacent to the —CO— group is joined to other atoms only by single bonds.

2. A diamide according to claim 1 in which R is a straight chain radical.

3. A diamide according to claim 1 in which R and R' are straight chain radicals.

4. Process of forming diamides which comprises reacting a diamine of the formula $NH_2$—R—$NH_2$ with a compound of the formula R'—CO—Q, wherein R and R' are radicals as set forth in claim 1 and Q is a radical whose hydride QH is miscible with water.

5. Process of forming diamides which comprises heating at reaction temperature a diamine of the formula $NH_2$—R—$NH_2$ (wherein R is a saturated open-chain hydrocarbon radical of at least six carbon atoms) with an acid of the formula R'COOH (wherein R' is an unsaturated open-chain hydrocarbon radical in which the carbon atom adjacent to the carboxyl group is joined to other atoms only by single bonds), continuing the heating until no more water is evolved, and thereafter isolating the diamide.

6. Process according to claim 5, R being a straight chain radical.

7. Process according to claim 5, R and R' being straight chain radicals.

8. Process according to claim 5, the temperature being in the range of from 160 to 270° C.

9. Process according to claim 5, the temperature being in the range of from 180 to 230° C.

10. Process according to claim 5, the temperature being in the range of from 180 to 230° C. and the reactants being in the proportion of about two moles of acid to one mole of amine.

11. Process of forming diamides which comprises heating at reaction temperature a diamine of the formula $NH_2$—R—$NH_2$ (wherein R is a saturated open-chain hydrocarbon radical of at least six carbon atoms) with a member of the class of acids of the formula R'COOH and amide-forming derivatives thereof (wherein R' is an unsaturated open-chain hydrocarbon radical in which the carbon atom adjacent to the carboxyl group is joined to other atoms only by single bonds), and thereafter isolating the diamide.

12. A diamide according to claim 1 wherein R is $(CH_2)_6$.

13. The diamide of hexamethylene diamine and 10-undecenoic acid.

14. A diamide according to claim 1 wherein R is $(CH_2)_{10}$.

15. The diamide of decamethylenediamine and oleic acid.

16. The diamide of decamethylenediamine and linseed oil acids.

VERNAL R. HARDY.